(12) United States Patent
Papasakellariou et al.

(10) Patent No.: US 9,485,070 B2
(45) Date of Patent: Nov. 1, 2016

(54) METHOD AND APPARATUS FOR TRANSMITTING AND RECEIVING DIFFERENT SIGNAL TYPES IN COMMUNICATION SYSTEMS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 4 days.

(21) Appl. No.: 14/106,082

(22) Filed: Dec. 13, 2013

(65) Prior Publication Data
US 2014/0105189 A1    Apr. 17, 2014

Related U.S. Application Data

(63) Continuation of application No. 13/413,274, filed on Mar. 6, 2012, now Pat. No. 8,619,748, which is a continuation of application No. 12/182,556, filed on Jul. 30, 2008, now Pat. No. 8,155,100.

(60) Provisional application No. 60/962,584, filed on Jul. 30, 2007, provisional application No. 60/974,305, filed on Sep. 21, 2007.

(51) Int. Cl.
| | |
|---|---|
| *H04L 5/00* | (2006.01) |
| *H04W 72/04* | (2009.01) |
| *H04L 5/02* | (2006.01) |
| *H04L 27/26* | (2006.01) |

(52) U.S. Cl.
CPC ........... *H04L 5/0053* (2013.01); *H04L 5/0007* (2013.01); *H04L 5/0037* (2013.01); *H04L 5/0051* (2013.01); *H04L 5/026* (2013.01); *H04L 27/261* (2013.01); *H04W 72/0413* (2013.01)

(58) Field of Classification Search
CPC ........................... H04L 5/0053; H04L 27/261
See application file for complete search history.

(56) References Cited

U.S. PATENT DOCUMENTS

| | | | |
|---|---|---|---|
| 8,102,809 B2 | 1/2012 | Muharemovic et al. | |
| 8,599,819 B2 * | 12/2013 | Kim et al. ..................... | 370/344 |
| 2004/0062191 A1 | 4/2004 | Lacroix-Penther et al. | |
| 2005/0013389 A1 | 1/2005 | Mizukami | |
| 2005/0084030 A1 | 4/2005 | Zhou et al. | |
| 2007/0171995 A1 | 7/2007 | Muharemovic et al. | |
| 2008/0080467 A1 | 4/2008 | Pajukoski et al. | |
| 2008/0090528 A1 | 4/2008 | Malladi | |

(Continued)

OTHER PUBLICATIONS

Texas Instruments, "On Uplink Pilot in EUTRA SC-FDMA", R1-051062, 3GPP TSG RAN WG1 Ad Hoc on LTE, Oct. 10-14, 2005.

(Continued)

*Primary Examiner* — Min Jung
(74) *Attorney, Agent, or Firm* — The Farrell Law Firm, P.C.

(57) ABSTRACT

A method and apparatus are provided for transmitting a Reference Signal (RS) by a User Equipment (UE) in a wireless communication system. The method includes transmitting a DeModulation Reference Signal (DM RS) and information data in a sub-frame; and transmitting a Sounding Reference Signal (SRS) in a last symbol in another sub-frame. The DM RS is transmitted in a middle symbol in each slot of the sub-frame, and the information data is transmitted in other symbols in each slot of the sub-frame.

32 Claims, 13 Drawing Sheets

(56) References Cited

U.S. PATENT DOCUMENTS

| | | | |
|---|---|---|---|
| 2008/0101440 A1 | 5/2008 | Lee | |
| 2008/0232325 A1 | 9/2008 | Mehta et al. | |
| 2008/0267269 A1* | 10/2008 | Enescu et al. | 375/219 |
| 2008/0268857 A1* | 10/2008 | McCoy | H04W 24/10 455/447 |
| 2008/0279170 A1 | 11/2008 | Malladi et al. | |
| 2009/0010240 A1 | 1/2009 | Papasakellariou et al. | |
| 2009/0022135 A1 | 1/2009 | Papasakellariou et al. | |
| 2009/0042615 A1* | 2/2009 | Teo et al. | 455/562.1 |
| 2009/0080569 A1* | 3/2009 | Han et al. | 375/316 |
| 2009/0290570 A1 | 11/2009 | Kishiyama et al. | |
| 2010/0034165 A1 | 2/2010 | Han et al. | |
| 2010/0069028 A1 | 3/2010 | Choi et al. | |
| 2010/0103902 A1 | 4/2010 | Kim et al. | |
| 2010/0135273 A1* | 6/2010 | Kim | 370/344 |
| 2010/0173639 A1* | 7/2010 | Li et al. | 455/450 |
| 2010/0278168 A1 | 11/2010 | Kwon et al. | |
| 2010/0322226 A1 | 12/2010 | McCoy | |

OTHER PUBLICATIONS

Samsung, "Sounding RS Multiplexing in E-UTRA UL—Interaction with PUCCH", R1-073092, 3GPP TSG RAN WG1 Meeting #49bis, Jun. 25-29, 2007.

Samsung, "Summary of Reflector Discussions on EUTRA UL RS", R1-073091, 3GPP TSG RAN WG1 Meeting #49bis, Jun. 25-29, 2007.

ETRI, "Non-Coherent ACK/NAK Signaling Using Code Sequences as Indicators in E-UTRA Uplink", R1-070078, 3GPP TSG RAN WG1 Meeting #47bis, Jan. 10, 2007.

NTT DoCoMo et al., "CDMA-Based Multiplexing Method for Multiple ACK/NACK and CQI in E-UTRA Uplink", R1-070862, 3GPP TSG RAN WG1 Meeting #48, Feb. 6, 2007.

NEC Group, "Reference Signal Multiplexing for Data-Non-Associated Control Signal in EUTRA Uplink", R1-062768, 3GPP TSG RAN WG1 Meeting #46bis, Oct. 4, 2006.

NTT DoCoMo et al., "Multiplexing Method for Orthogonal Reference Signals for E-UTRA Link", R1-063307, 3GPP TSG RAN WG1 Meeting #47, Nov. 2, 2006.

NTT DoCoMo et al., "Orthogonal Pilot Channel Structure in E-UTRA Uplink", R1-060046, 3GPP TSG-RAN WG1 LTE Ad Hoc Meeting, Jan. 19, 2006.

Motorola, "Multiplexing of UL L1/L2 Control Signals in the Absence of Data", R1-072185, 3GPP TSG RAN1 #49, May 2, 2007.

NEC Group, NTT DoCoMo, "Discussion on Uplink Reference Signal", R1-072116, 3GPP TSG RAN WG1 Meeting #49, May 7-11, 2007.

Texas Instruments, "Preamble Based Scheduling Request: A Generic Structure", R1-072193, 3GPP TSG RAN WG1 #49, May 7-11, 2007.

European Search Report dated May 21, 2015 issued in counterpart application No. 15151887.5-1860.

* cited by examiner

METHOD AND APPARATUS FOR TRANSMITTING AND RECEIVING DIFFERENT SIGNAL TYPES IN COMMUNICATION SYSTEMS

PRIORITY

This application is a Continuation Application of U.S. application Ser. No. 13/413,274, which was filed in the U.S. Patent and Trademark Office on Mar. 6, 2012, as a Continuation Application of U.S. application Ser. No. 12/182,556, which was filed on Jul. 30, 2008, now U.S. Pat. No. 8,155,100, issued on Apr. 10, 2012, and claims priority to U.S. Provisional Application Nos. 60/962,584 and 60/974,305, which were filed in the U.S. Patent and Trademark Office on Jul. 30, 2007 and Sep. 21, 2007, respectively, the content of each of which is incorporated herein by reference.

BACKGROUND OF THE INVENTION

1. Field of the Invention

The present invention is directed, in general, to wireless communication systems and, more specifically, to a Single-Carrier Frequency Division Multiple Access (SC-FDMA) communication system.

2. Description of the Art

In particular, the present invention is directed to the transmission and multiplexing of Reference Signals (RSs) in SC-FDMA communication systems.

Several types of signals should be supported for the proper functionality of a communication system. In addition to data signals, which convey information content of a communication, control signals also need to be transmitted from User Equipments (UEs) to their serving Base Station (BS or Node B) in the UpLink (UL) of the communication system and from the serving Node B to the UEs in the DownLink (DL) of the communication system in order to enable the proper transmission of data signals. For example, control signals include positive or negative acknowledgement signals (ACK or NACK, respectively), transmitted by a UE in response to (correct or incorrect, respectively) data packet reception and Channel Quality Indication (CQI) signals conveying information about the DL channel conditions experienced by the UE. Furthermore, RSs (also known as pilots) are typically transmitted by each UE having UL data or control transmission. These RSs provide coherent demodulation for the transmitted data and will be referred to as DeModulation (DM) RSs.

The present invention considers the UL communication and assumes that the transmission of signals carrying the data content information from UEs is through a Physical Uplink Shared CHannel (PUSCH) while, in the absence of data information, the transmission of control signals from the UEs is through the Physical Uplink Control CHannel (PUCCH).

A UE, also commonly referred to as a terminal or a mobile station, may be fixed or mobile and may be a wireless device, a cellular phone, a personal computer device, a wireless modem card, etc. Additionally, a Node B is generally a fixed station and may also be called a Base Transceiver System (BTS), an access point, etc.

The UEs are assumed to transmit data or control signals over a Transmission Time Interval (TTI), which in an exemplary embodiment of the present invention corresponds to a sub-frame.

FIG. 1 illustrates a block diagram of a sub-frame structure 110 assumed in an exemplary embodiment of the present invention for PUSCH transmission. The sub-frame includes two slots. A first slot 120 further includes seven symbols used for the transmission of data and/or control signals. Each symbol 130 further includes a Cyclic Prefix (CP) for mitigating interference caused by channel propagation effects. The signal transmission in one slot may be in the same part or it may be at a different part of the operating bandwidth than the signal transmission in the other slot. In addition to symbols carrying data or control information, some symbols may be used for the RS transmission, i.e., DM RS 140, to provide channel estimation and enable coherent demodulation of the received signal. It is also possible for the TTI to include only one slot or more than one sub-frames.

The transmission BandWidth (BW) is assumed to include frequency resource units, which will be referred to herein as Resource Blocks (RBs). An exemplary embodiment of the present invention assumes that each RB includes 12 sub-carriers, and that UEs are allocated a multiple N of consecutive RBs 150 for PUSCH transmission and 1 RB for PUCCH transmission. Nevertheless, it should be noted that the above values are only illustrative and should restrict the described embodiments of the invention.

In order for the Node B to determine the RBs where to schedule the PUSCH transmission by a UE and the Modulation and Coding Scheme (MCS) used for the data, a CQI estimate is needed over the PUSCH transmission BW, which is smaller than or equal to the operating BW. Typically, this CQI estimate is obtained through the transmission by the UE of another RS sounding the scheduling bandwidth (Sounding RS or SRS). This SRS is transmitted in a symbol of an UL sub-frame replacing the data, it is used to provide a Signal-to-Interference and Noise Ratio (SINR) estimate over the RBs comprising its transmission BW, and it can be further used for UL Transmission Power Control (TPC) and UL synchronization.

FIG. 2 illustrates an exemplary embodiment for SRS transmission occurring in one sub-frame symbol every 2 sub-frames for a respective 4.3% SRS overhead. UE1 210 and UE2 220 multiplex their PUSCH transmissions in different parts of the operating BW during a first sub-frame 240, while UE2 220 and UE3 230 multiplex their PUSCH transmissions in different parts of the operating BW during a second sub-frame 250. In some symbols of the sub-frame, the UEs transmit DM RS in order to enable the Node B receiver to perform coherent demodulation of the data signal transmitted in the remaining symbols of the sub-frame with UE1, UE2, and UE3 transmitting respectively DM RS 260, 270, and 280.

In the exemplary structure illustrated in FIG. 2, the first symbol every second sub-frame is used for SRS transmission 290. The UEs having SRS transmission may or may not have PUSCH transmission in the same sub-frame. The SRS transmission may occupy a different part of the operating BW than the data or DM RS transmission from a UE. Moreover, although in the exemplary embodiment the SRS transmission occurs during the first symbol of a sub-frame, any other symbol, such as the last symbol of a sub-frame, may be used.

An exemplary block diagram for data transmission through SC-FDMA signaling is illustrated in FIG. 3. Referring to FIG. 3, the encoded data 310 is provided to a Discrete Fourier Transform (DFT) unit 320, the sub-carriers 330 corresponding to the assigned transmission BW are selected 340, the Inverse Fast Fourier Transform (IFFT) is performed 350, and finally the Cyclic Prefix (CP) 360 and filtering 370, such as time windowing, are applied to the transmitted signal. Zero padding is assumed to be inserted by the reference UE in sub-carriers used for the signal transmission by another UE and in guard sub-carriers (not shown).

Moreover, for brevity, additional transmitter circuitry such as digital-to-analog converters, analog filters, amplifiers, transmitter antennas, etc., are not illustrated in FIG. 3. Similarly, the encoding process and the modulation process for the data, which are well known in the art, such as turbo coding and Quadrature Phase Shift Keying (QPSK), or Quadrature Amplitude Modulation (QAM) 16, or QAM64 modulation, are also omitted for brevity.

FIG. 4 illustrates an exemplary transmitter structure for the DM RS, which is assumed to be based on the time-domain transmission of Constant Amplitude Zero Auto-Correlation (CAZAC) sequences and will be subsequently described in detail.

In FIG. 4, a CAZAC-based sequence 410 is cyclically shifted 420. The DFT of the resulting sequence is obtained 430, the sub-carriers 440 corresponding to the assigned transmission BW are selected 450, the IFFT is performed 460, and finally, the CP 470 and filtering 480 are applied to the transmitted signal 490. Zero padding is assumed to be inserted by the reference UE in sub-carriers used for the signal transmission by another UE and in guard sub-carriers (not shown).

The exemplary transmitter structure illustrated in FIG. 4 can also be used, possibly with minor modifications (such as the repetition in time of the CAZAC-based sequence to produce a comb spectrum), for the SRS transmission.

As for the data transmission, for brevity, additional transmitter circuitry such as digital-to-analog converters, analog filters, amplifiers, transmitter, etc., are not illustrated in FIG. 4.

An alternative generation method for the transmitted CAZAC-based sequence, serving as DM RS or as SRS, is in the frequency domain. This is illustrated in FIG. 5. For the SRS it is also possible that the selected sub-carriers are not consecutive (comb spectrum) in order to multiplex SRS transmissions from multiple UEs over different BWs. However, this is not material to the present invention.

Referring to FIG. 5, the generation of the transmitted CAZAC-based sequence in the frequency domain follows the same steps as in the time domain with two exceptions. The frequency domain version of the CAZAC-based sequence is used 510 (that is, the DFT of the CAZAC-based sequence is pre-computed and not included in the transmission chain) and the cyclic shift 550 is applied after the IFFT 540. The selection 520 of the sub-carriers 530 corresponding to the assigned transmission bandwidth, and the application of CP 560 and filtering 570 to the transmitted signal 580, as well as other conventional functionalities (not shown), are the same as previously described for FIG. 3.

At the receiver, the inverse (or complementary) transmitter functions are performed. For the DM RS, this is conceptually illustrated in FIG. 6, in which the reverse operations of those in FIG. 4 apply, and in FIG. 7, in which the reverse operations of those in FIG. 5 apply.

Referring to FIG. 6, an antenna receives the Radio-Frequency (RF) analog signal and after being processed by further processing units (such as filters, amplifiers, frequency down-converters, and analog-to-digital converters) the digital received signal 610 passes through a time windowing unit 620 and the CP is removed 630. Subsequently, the receiver unit applies an FFT 640, selects 650 the sub-carriers 655 used by the transmitter, applies an Inverse DFT (IDFT) 660, removes the cyclic shift 670 applied to the transmitted CAZAC-based sequence and, using a replica of the CAZAC-based sequence 680, multiplies (correlates) with the resulting signal 690 to produce an output 695 that can be used for channel estimation or CQI estimation for the UL channel.

Similarly in FIG. 7, the digital received signal 710 passes through a time windowing unit 720 and the CP is removed 730. Subsequently, the cyclic shift of the transmitted CAZAC-based sequence is restored 740, an FFT 750 is applied, the selection 760 of the transmitted sub-carriers 765 is performed and correlation 770 with the CAZAC-based sequence replica 780 is subsequently applied. Finally, the output 790 is obtained which can then be passed to a channel estimation unit, such as a time-frequency interpolator, or a CQI estimation unit for the UL channel.

As for the transmitter, functionalities that are well known in the art, such as channel estimation, demodulation, and decoding are not shown for brevity, as they are not material to the present invention.

As mentioned above, the RS (DM RS or SRS) is assumed to be constructed from CAZAC-based sequences. An example of such sequences is given by the following Equation (1):

$$c_k(n) = \exp\left[\frac{j2\pi k}{L}\left(n + n\frac{n+1}{2}\right)\right]. \quad (1)$$

In Equation (1), L is a length of the CAZAC sequence, n is an index of an element of the sequence n={0, 1, 2 . . . , L−1}, and k is an index of the sequence itself. For a given length L, there are L−1 distinct sequences, if L is prime. Therefore, an entire family of sequences is defined as k ranges in {1, 2 . . . , L−1}. However, it should be noted that the CAZAC sequences used for the CQI and RS generation need not be generated using the exact above expression as will be further discussed below.

For CAZAC sequences of prime length L, the number of sequences is L−1. As the RBs are assumed to include an even number of sub-carriers, with 1 RB including 12 sub-carriers, the sequences used to transmit the ACK/NACK and RS can be generated, in the frequency or time domain, by either truncating a longer prime length (such as length 13) CAZAC sequence or by extending a shorter prime length (such as length 11) CAZAC sequence by repeating its first element(s) at the end (cyclic extension), although the resulting sequences do not specifically fulfill the definition of a CAZAC sequence. Alternatively, CAZAC-based sequences can be generated through a computer search for sequences satisfying the CAZAC properties.

Different cyclic shifts of the same CAZAC sequence provide orthogonal CAZAC sequences. Therefore, different cyclic shifts of the same CAZAC sequence can be allocated to different UEs and achieve orthogonal multiplexing of the RS transmitted by these UEs in the same RBs. This principle is illustrated in FIG. 8.

Referring to FIG. 8, in order for the multiple CAZAC-based sequences 810, 830, 850, and 870 generated correspondingly from multiple cyclic shifts 820, 840, 860, and 880 of the same root CAZAC-based sequence to be orthogonal, the cyclic shift value Δ 890 should exceed the channel propagation delay spread D, including a time uncertainty error and filter spillover effects. If $T_S$ is the duration of one symbol, the number of cyclic shifts is equal to the mathematical floor of the ratio $T_S/D$. For 12 cyclic shifts and for symbol duration of about 66 microseconds (14 symbols in a 1 millisecond sub-frame), the time separation of consecutive cyclic shifts is about 5.5 microseconds. Alternatively, to provide better protection against multipath propagation, only 6 cyclic shifts should be used, providing time separation of about 11 microseconds.

The present invention assumes that the PUCCH transmission is entirely based on CAZAC-based sequences and, similarly to FIG. 1 for the PUSCH, corresponding exemplary PUCCH structures for ACK/NACK transmission and CQI transmission are respectively illustrated in FIG. 9 and FIG. 10. Also as for PUSCH VoIP transmissions, the PUCCH transmission in the first slot of a sub-frame is assumed to occur at a different part of the operating bandwidth than the PUCCH transmission in the second slot of the sub-frame.

In the exemplary structure illustrated in FIG. 9, a UE transmits ACK/NACK 910 in four symbols of each slot and RS 920 in three symbols of each slot. Both ACK/NACK and RS transmissions are based on the transmission of a CAZAC-based sequence 930 (modulated in case of ACK/NACK by the respective ACK/NACK bits). The multiplexing of ACK/NACK signals and RS from different UEs is through the use of different cyclic shifts of a CAZAC-based sequence, as previously described, and through the use of orthogonal covers {W1, W2, W3, W4} 940 of length 4, such as Walsh-Hadamard codes, for the ACK/NACK and length 3 {H1, H2, H3} 950, such as DFT codes, for the RS.

In the exemplary setup illustrated in FIG. 10, the CQI bits 1010 are transmitted in five symbols of each slot and the respective RS 1020 is transmitted in two symbols of each slot. The multiplexing of CQI signals and RS from different UEs is again through different cyclic shifts of a CAZAC-based sequence (modulated in case of CQI) 1030. An orthogonal cover {G1, G2} 1040 of length 2, such as Walsh-Hadamard, may also apply for the RS transmission.

The transmitter and receiver structures for the CAZAC-based sequences used in PUCCH transmissions are practically the same with the corresponding ones in FIG. 4 and FIG. 5 (transmitter) and FIG. 6 and FIG. 7 (receiver), respectively, and are not repeated for brevity.

An exemplary embodiment of the present invention considers Voice over Internet Protocol (VoIP), which represents an important application in communication systems. Unlike data packets, VoIP packets typically occupy a predetermined BW of a few RBs due to their small size. For BW fragmentation reasons, due to the single carrier property, and for frequency diversity of VoIP transmissions, the RBs may be towards one edge of the operating BW in the first slot and towards the other edge during the second slot of the sub-frame. Also, unlike data packets, VoIP packets are typically transmitted at predetermined time intervals, such as once every 20 msec.

Given that a large number of VoIP UEs, such as 200-300 at 5 MHz system BW or 400-600 at 10 MHz system BW, may be active for a fully loaded system, the respective SRS transmission overhead is an important consideration. For example, if 600 VoIP UEs for 10 MHz system BW are equally divided over a period of 20 msec and assuming a 50% voice activity factor, 15 VoIP UEs will be transmitting in every sub-frame. In several operating environments the number of cyclic shifts that can be used to orthogonally multiplex CAZAC-based sequences transmitted over common BW is much smaller than 15 and substantial overhead is required to support SRS transmissions from VoIP UEs.

Therefore there is a need to support SRS transmission for VoIP UEs without introducing large respective overhead in the UL of the communication system. Moreover, there is a need for the SRS transmission from VoIP UEs to enable optimum sounding conditions in order for the Node B to perform link adaptation. Link adaptation may be in the form of TPC commands or MCS adjustments transmitted by the serving Node B to a VoIP UE.

Additionally, considering the voice activity, it is desirable to re-assign radio resources in the silent period, i.e., when a VoIP UE does not have a data packet to transmit, to another UE in order to improve BW utilization. A VoIP UE may transmit a Release Request (RR) to its serving Node B to indicate that its buffer is empty. Conversely, when a VoIP UE exits a silent period, it needs to send a Service Request (SR) to indicate that it has packets for transmission. This operation is illustrated in FIG. 11 for the case of RR but the same concept applies in case of SR.

Referring to FIG. 11, a VoIP UE transmits packets 1110 and when its buffer empties, the VoIP UE sends a RR 1120. When the serving Node B receives the RR 1130, it re-assigns the BW resources to the VoIP transmission from another UE 1140.

The nature of the single-state transmission information the VoIP UE sends (RR, SR, etc.) is immaterial to the purposes of the present invention. The focus is instead on the signaling used by the VoIP UE to send this single-state information.

The prior art considers that either a separate channel is used for the transmission of the RR or SR, or a few bits are punctured from the CQI feedback the VoIP UE sends to its serving Node B regarding the DL SNR operating conditions and replaced with the transmission of the RR or SR. The first prior art option introduces additional UL overhead and system complexity as a new channel needs to be defined and supported. The second prior art option typically compromises the accuracy of the CQI reception and of the RR or SR reception, and increases the complexity of the Node B receiver.

There is consequently a need to provide a signaling mechanism for VoIP UEs to transmit state transition information, such as a RR or SR, without introducing additional overhead or compromising the quality of other signals such as the CQI, while introducing only minimal additional complexity to the Node B receiver operation.

SUMMARY OF THE INVENTION

Accordingly, the present invention has been designed to solve the aforementioned problems occurring in the prior art, and the present invention provides an apparatus and method for multiplexing the transmission of at least one reference signal from a User Equipment (UE) not having any other signal transmission, i.e., no transmission of data or control signals, with the transmission of a reference signal from at least another UE that also transmits a data signal or a control signal during the same transmission time interval.

Additionally, the present invention enables the sounding of the operating bandwidth by a UE, to enable the serving Base Station (or Node B) to perform link adaptation for the signal transmitted by the UE, without consuming additional bandwidth resources in the UpLink (UL) of the communication system.

Additionally, the present invention enables a UE to transmit state information, such as a release request or a service request, to its serving Node B by multiplexing the respective signal transmission with the transmission of signals of the same structure transmitted from other UEs, without consuming additional bandwidth resources in the UL of the communication system.

In accordance with an aspect of the present invention, a method for transmitting a Reference Signal (RS) by a User Equipment (UE) in a wireless communication system is provided. The method includes transmitting a DeModulation Reference Signal (DM RS) and information data in a sub-frame; and transmitting a Sounding Reference Signal (SRS) in a last symbol in another sub-frame. The DM RS is transmitted in a middle symbol in each slot of the sub-frame, and the information data is transmitted in other symbols in each slot of the sub-frame.

In accordance with another aspect of the present invention, a method for receiving a Reference Signal (RS) by a Node B in a wireless communication system is provided. The method includes receiving a DeModulation Reference Signal (DM RS) and information data in a sub-frame; and receiving a Sounding Reference Signal (SRS) in a last symbol in another sub-frame. The DM RS is received in a middle symbol in each slot of the sub-frame, and the information data is received in other symbols in each slot of the sub-frame.

In accordance with another aspect of the present invention, a UE is provided for transmitting a Reference Signal (RS) in a wireless communication system. The UE includes a controller; and a transmitter for transmitting a DeModulation Reference Signal (DM RS) and information data in a sub-frame, and for transmitting a Sounding Reference Signal (SRS) in a last symbol in another sub-frame. The DM RS is transmitted in a middle symbol in each slot of the sub-frame, and the information data is transmitted in other symbols in each slot of the sub-frame.

In accordance with another aspect of the present invention, a Node B is provided for receiving a Reference Signal (RS) in a wireless communication system. The Node B includes a controller; and a receiver for receiving a DeModulation Reference Signal (DM RS) and information data in a sub-frame, and for receiving a Sounding Reference Signal (SRS) in a last symbol in another sub-frame. The DM RS is received in a middle symbol in each slot of the sub-frame, and the information data is received in other symbols in each slot of the sub-frame.

In accordance with another aspect of the present invention, a method for transmitting a Reference Signal (RS) by a User Equipment (UE) in a wireless communication system is provided. The method includes transmitting a DeModulation Reference Signal (DM RS), information data, and a Sounding Reference Signal (SRS) in a sub-frame including two slots, each of the two slot including seven symbols. The DM RS is transmitted in a middle symbol in each of the two slots, the SRS is transmitted in a last symbol in the sub-frame, and the information data is transmitted in first, second, third, fifth, sixth, and seventh symbols in a first slot of the two slots, and in first, second, third, fifth, and sixth symbols in a second slot of the two slots.

In accordance with another aspect of the present invention, a method for receiving a Reference Signal (RS) by a Node B in a wireless communication system is provided. The method includes receiving a DeModulation Reference Signal (DM RS), information data, and a Sounding Reference Signal (SRS) in a sub-frame including two slots, each of the two slots including seven symbols. The DM RS is received in a middle symbol in each of the two slots, the SRS is received in a last symbol the sub-frame, and the information data is transmitted in first, second, third, fifth, sixth, and seventh symbols in a first slot of the two slots, and in first, second, third, fifth, and sixth symbols in a second slot of the two slots.

In accordance with another aspect of the present invention, a UE is provided for transmitting a Reference Signal (RS) in a wireless communication system. The UE includes a controller; and a transmitter for transmitting a DeModulation Reference Signal (DM RS), an information data, and a Sounding Reference Signal (SRS) in a sub-frame including two slots, each of the two slots including seven symbols. The DM RS is transmitted in a middle symbol in each of the two slots, the SRS is transmitted in a last symbol in the sub-frame, and the information data is transmitted in first, second, third, fifth, sixth, and seventh symbols in a first slot of the two slots, and in first, second, third, fifth, and sixth symbols in a second slot of the two slots.

In accordance with another aspect of the present invention, a Node B is provided for receiving a Reference Signal (RS) in a wireless communication system. The Node B includes a controller; and a receiver for receiving a DeModulation Reference Signal (DM RS), information data, and a Sounding Reference Signal (SRS) in a sub-frame including two slots, each of the two slots including seven symbols. The DM RS is received in a middle symbol in each slot of the two slots, the SRS is received in a last symbol in the sub-frame, and the information data is transmitted in first, second, third, fifth, sixth, and seventh symbols in a first slot of the two slots, and in first, second, third, fifth, and sixth symbols in a second slot of the two slots.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will be described more fully hereinafter with reference to the accompanying drawings. The present invention may, however, be embodied in many different forms and should not be construed as being limited to the embodiments set forth herein. Rather, these illustrative embodiments are provided so that this disclosure will be thorough and complete and will fully convey the scope of the invention to those skilled in the art.

Additionally, although the present invention is described with reference to a Single-Carrier Frequency Division Multiple Access (SC-FDMA) communication system, it also applies to all FDM systems in general and to Orthogonal FDMA (OFDMA), OFDM, FDMA, Discrete Fourier Transform (DFT)-spread OFDM, DFT-spread OFDMA, Single-Carrier OFDMA (SC-OFDMA), and SC-OFDM in particular.

The embodiments of the present invention solve problems related to the need for multiplexing the transmission of Sounding Reference Signals (SRSs) and state information signals, such as a Release Request (RR) or a Service Request (SR), without incurring additional bandwidth overhead in the UpLink (UL) of a communication system.

An often underutilized resource in SC-FDMA signaling is the cyclic shifts used to multiplex the DM RS in the PUSCH or all signals in the PUCCH. Especially for VoIP UEs, where spatial domain multiplexing is unlikely, only a few out of a maximum of usually 6-12 cyclic shifts are used. It is therefore possible to orthogonally multiplex, through the use of different cyclic shifts of the CAZAC-based sequence, the DM RS from a first UE having PUSCH transmission over a TTI with an RS from a second UE having no other signal transmission. The RS from the second UE may serve as SRS. This is illustrated in FIG. 12.

Figure 1:
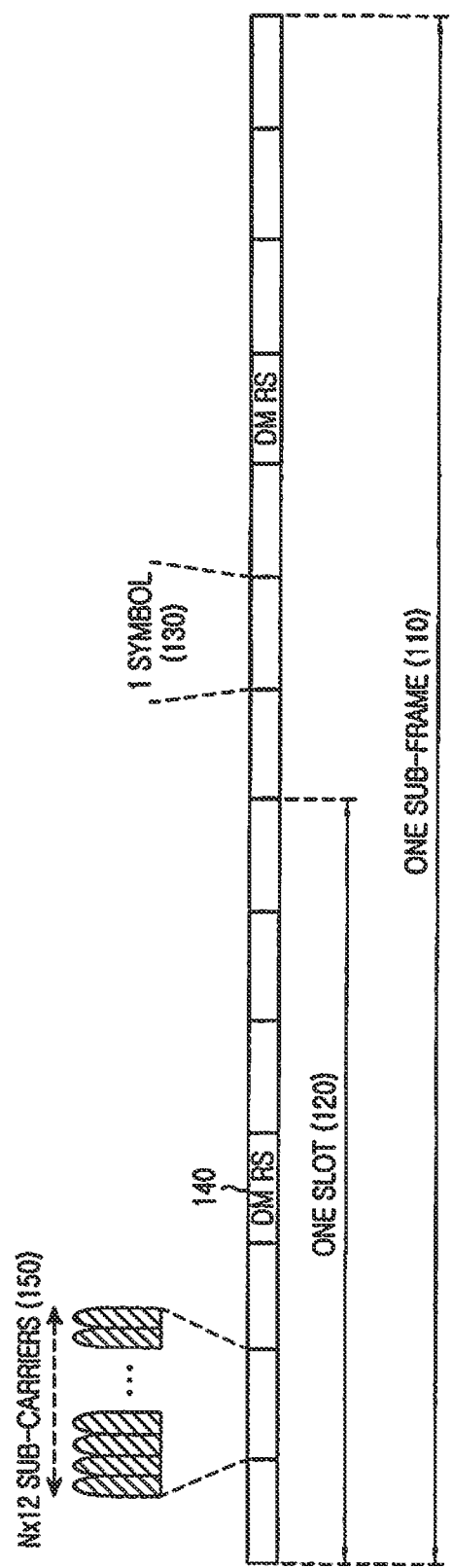
FIG. 1 is a diagram illustrating an exemplary sub-frame structure for an SC-FDMA communication system.
Figure 2:
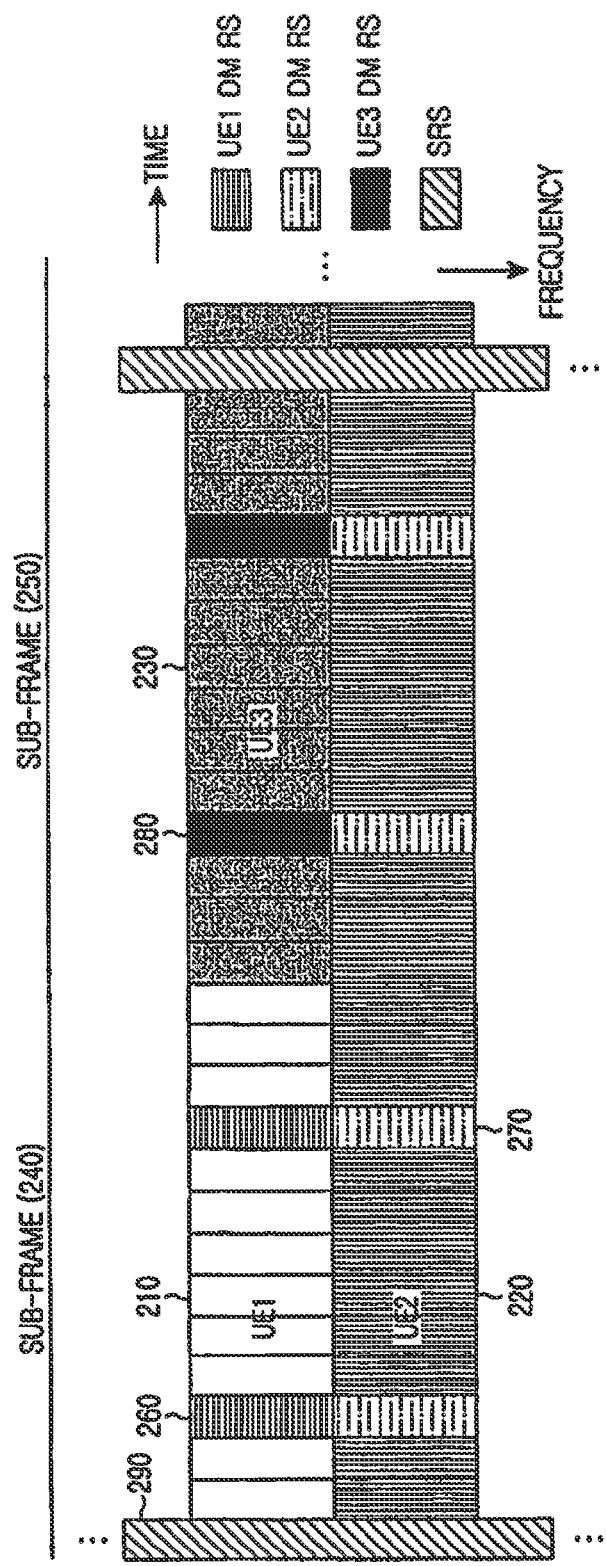
FIG. 2 is a diagram illustrating multiplexing, in time and frequency, PUSCH transmissions from different UEs and SRS transmissions.
Figure 3:
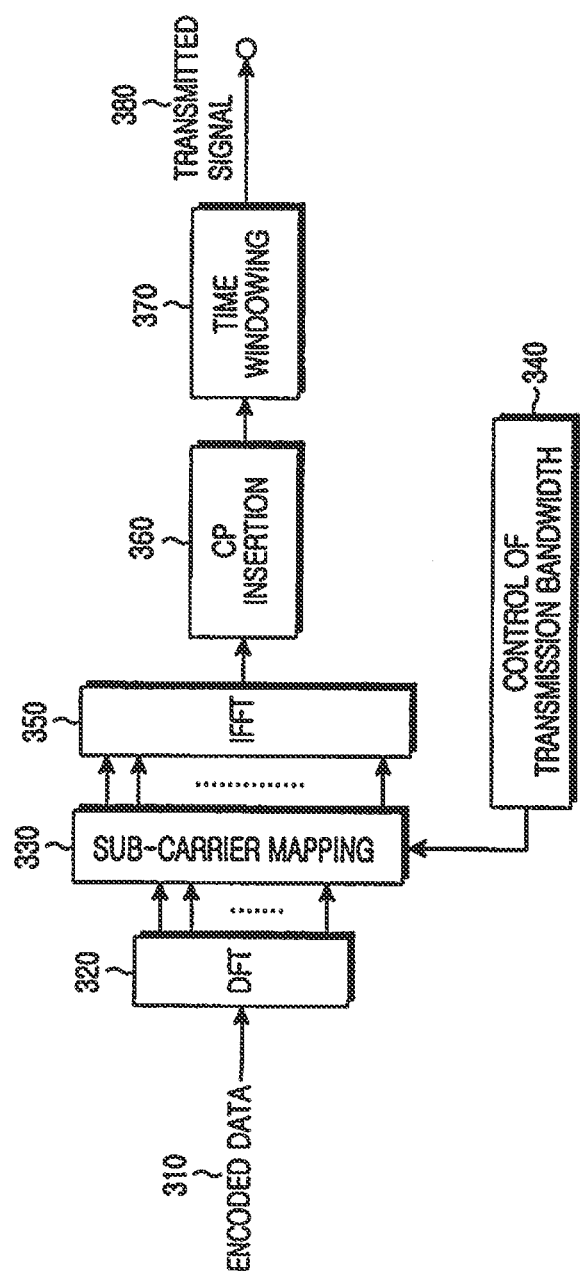
FIG. 3 is a block diagram illustrating an exemplary SC-FDMA transmitter for transmitting data information.
Figure 4:
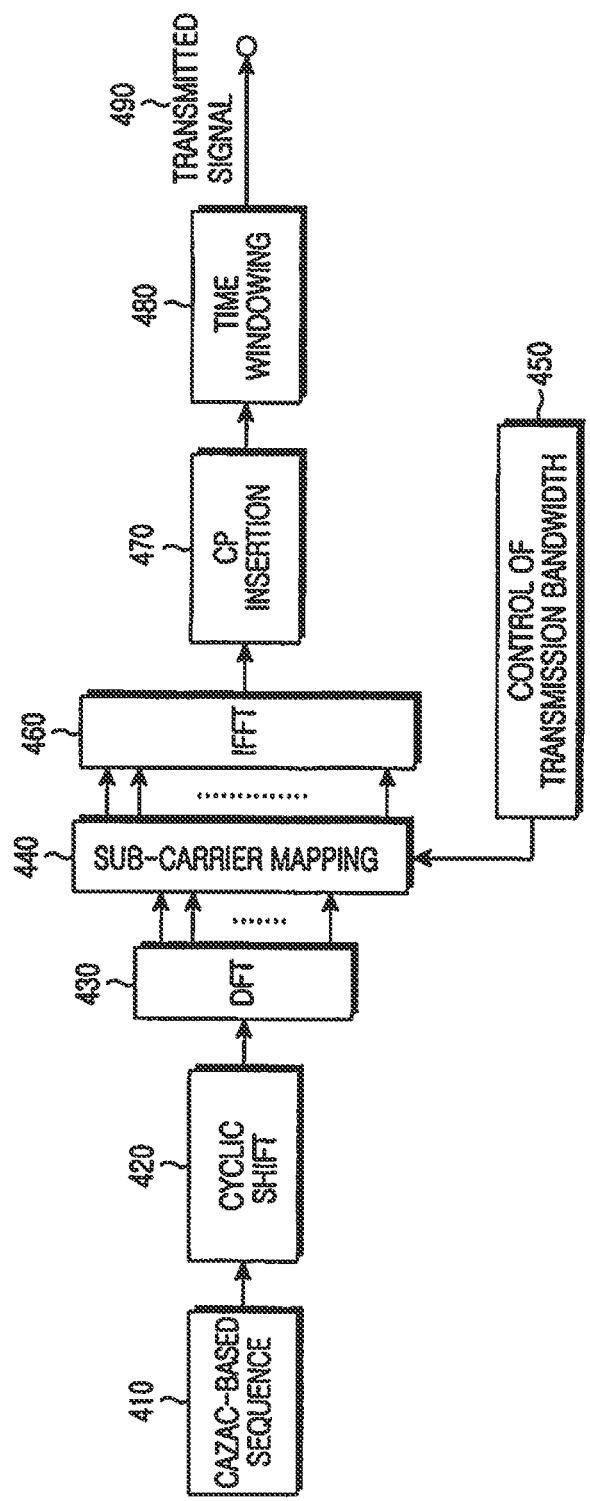
FIG. 4 is a block diagram illustrating a first exemplary SC-FDMA transmitter for transmitting a reference signal, an ACK/NACK signal, or a CQI signal, using a CAZAC-based sequence in the time domain.
Figure 5:
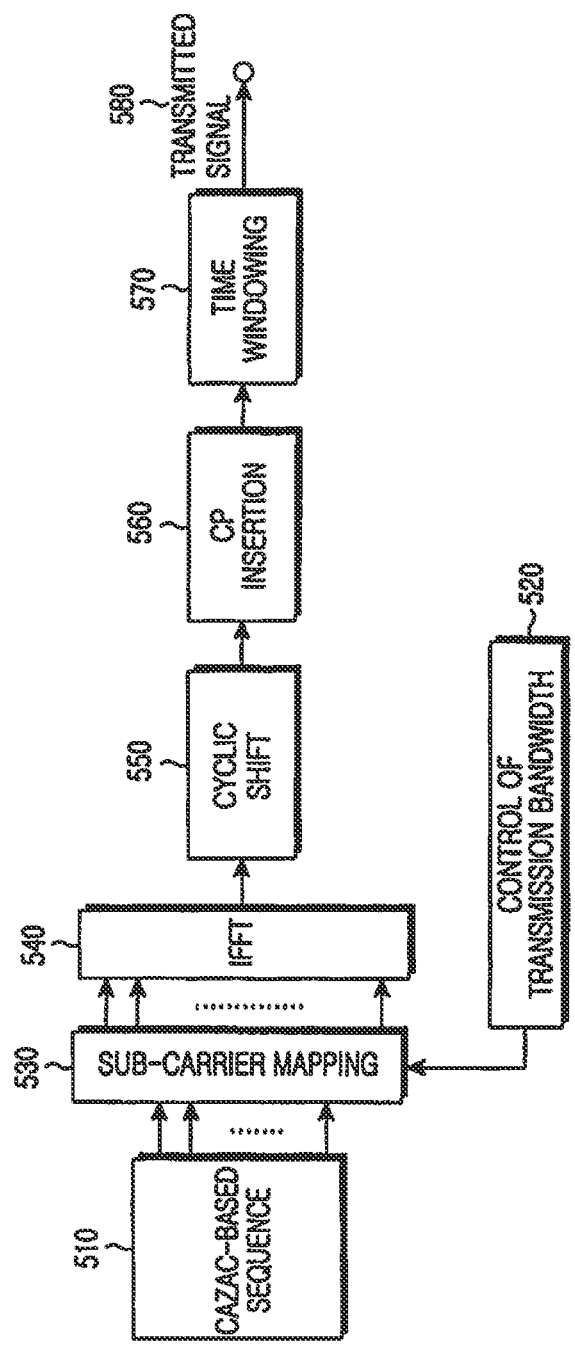
FIG. 5 is a block diagram illustrating a second exemplary SC-FDMA transmitter for transmitting a reference signal, an ACK/NACK signal, or a CQI signal, using a CAZAC-based sequence in the frequency domain.
Figure 12:
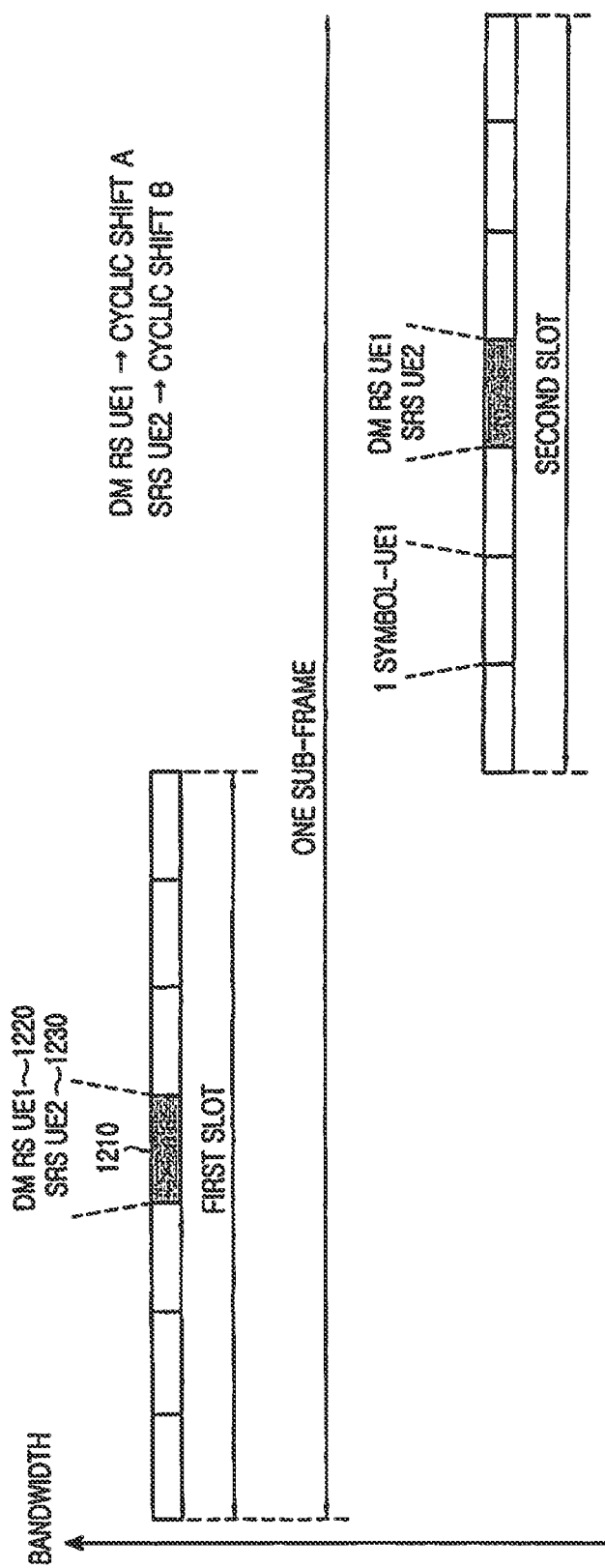
FIG. 12 is a diagram illustrating multiplexing a reference signal from a UE having another signal transmission in the corresponding transmission time interval and a reference signal from a UE without any other signal transmission in the corresponding transmission time interval.

Referring to FIG. 12, assuming the PUSCH sub-frame structure described in FIG. 1, during symbol 1210 used for RS transmission in each slot, the DM RS 1220 from UE1 and the SRS 1230 from UE2 are multiplexed using different cyclic shifts of the same CAZAC-based sequence. As it will be subsequently discussed, the same principle also directly applies for the PUCCH.

Figure 13:
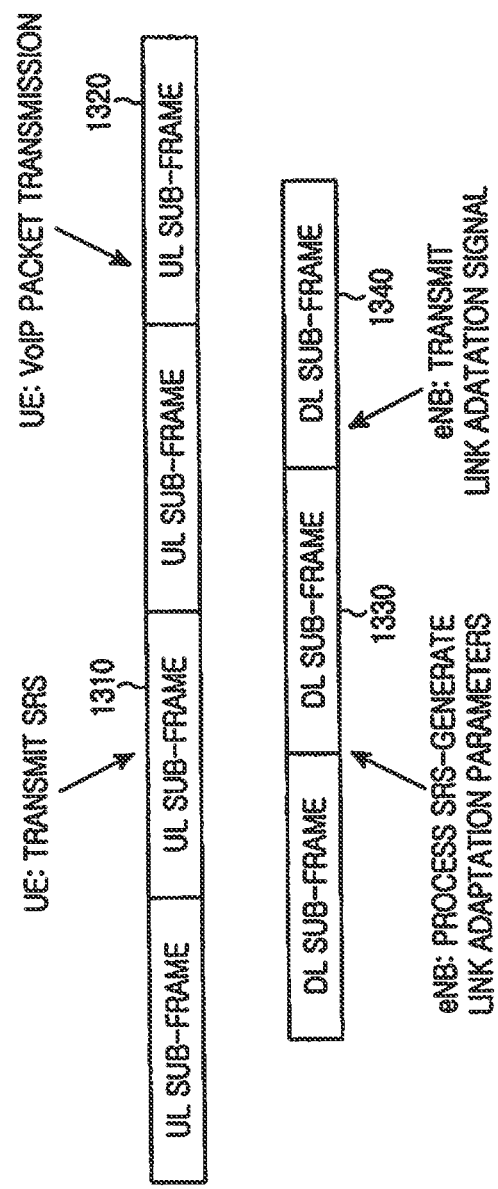
FIG. 13 is a diagram illustrating a link adaptation process for the signal transmitted by a UE.

The serving Node B can therefore configure a first UE to transmit at least one RS having the same structure but different cyclic shift as the DM RS of another UE, without the first UE having any other (non-RS) signal transmission in the respective TTI. The RS can serve as an SRS to enable link adaptation for PUSCH or PUCCH transmission from the first UE. This can be achieved by the Node B either signaling a TPC command or configuring the MCS used by the first UE for its subsequent data or control transmissions. FIG. 13 illustrates this process.

Referring to FIG. 13, the sub-frame 1310, where the UE transmits its SRS, may be a few sub-frames before the sub-frame 1340 of its PUSCH or PUCCH transmission, depending on the offset between DL and UL transmissions, on the propagation delay, and on the time it takes for the Node B to process the SRS 1320 and generate/transmit the link adaptation signaling 1330.

The previously described at least one RS transmission from a UE without any other (non-RS) signal transmission in the respective TTI is configured by the Node B specifying each of the at least one RS transmission parameters of cyclic shift and transmission sub-frame. Additionally, the Node B may further specify the RBs where the SRS transmission occurs. The Node B may specify these parameters explicitly or implicitly. In the latter case, the RBs may be determined by the assigned cyclic shift or vice versa. For example, if the RS transmission from a UE is assigned a first cyclic shift value, the transmission is in the same RBs as for its PUSCH or PUCCH transmission while if it is assigned a second cyclic shift value, the transmission is in other predetermined RBs relative to the ones for the PUSCH or PUCCH transmission.

Multiplexing at least one RS from one or more UEs with the DM RS from a UE having PUSCH transmission or with the PUCCH transmission from a UE enables the multiplexed RS to serve as an SRS with optimal BW utilization (no additional overhead). The transmission timing of the SRS can be chosen so that it is most relevant for link adaptation. Moreover, as the SRS power is concentrated in a few RBs, it provides for optimal SNR estimation. Also, as RBs in both BW sides can be sounded (the RS transmission in the first slot is in different BW than the RS transmission in the second slot), broad knowledge of the channel experienced by the UE can be obtained by the serving Node B. For the low UE speeds, this SRS can also serve as DM RS for a subsequent PUSCH transmission, effectively doubling the DM RS power, improving the channel estimation, and providing substantial performance gains particularly at low operating SINRs.

When there are only a few UEs in the system, the transmission of at least one RS from a UE without any other (non-RS) signal transmission in the respective TTI can still follow the same principles, but instead of being multiplexed with the PUSCH DM RS from another UE, it may instead be multiplexed in an RB allocated to PUCCH. As for the PUSCH DM RS transmission, the PUCCH transmission is also assumed to be through CAZAC-based sequences and the multiplexing of UEs is performed using different cyclic shifts of the CAZAC-based sequence as it was previously described.

Figure 9:
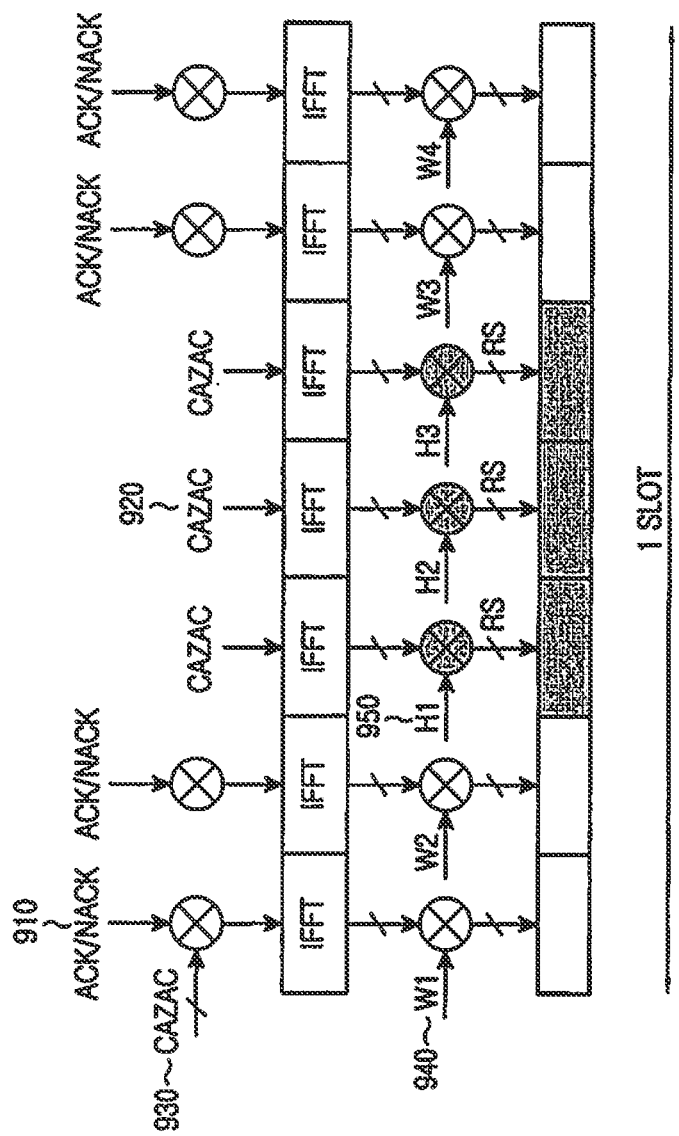
FIG. 9 is a diagram illustrating an exemplary PUCCH structure for transmitting ACK/NACK signals.
Figure 11:
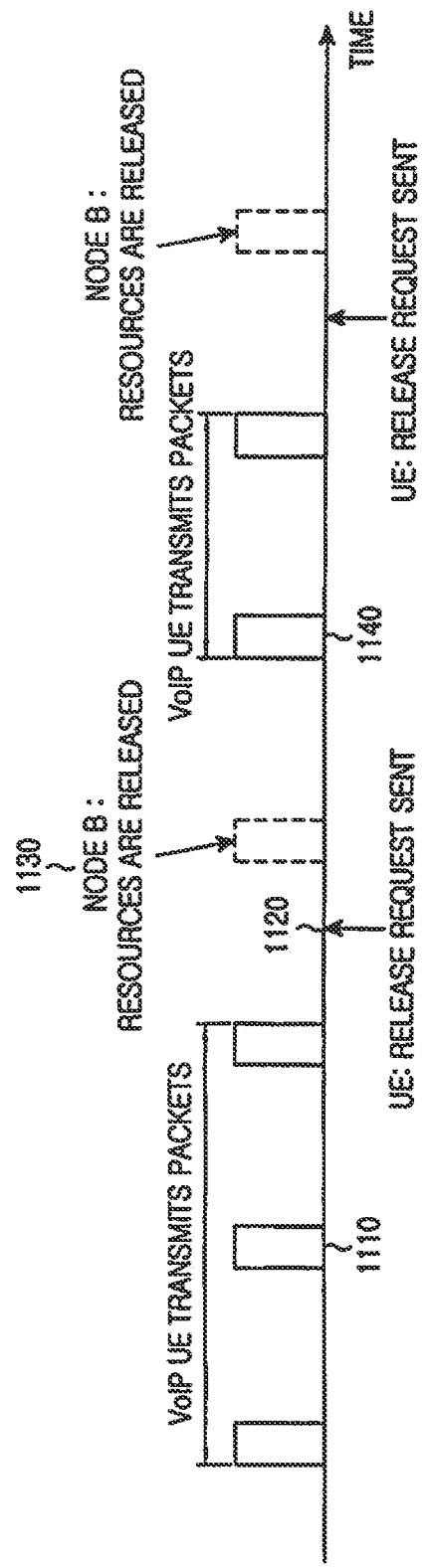
FIG. 11 is a diagram illustrating an exemplary mechanism to release resources used for signal transmission by a UE.

If the RS multiplexing from a first UE is with the ACK/NACK transmission from another UE, the Node B informs the first UE of the respective RB and of the corresponding multiplexing rules it needs to apply including the appropriate orthogonal cover in each slot and the appropriate cyclic shift in each SC-FDMA symbol. The same principle as described in FIG. 11 applies, but instead of a single DM RS per slot, the multiplexing applies over the entire slot because it consists of transmission of CAZAC-based sequence as illustrated in FIG. 9.

Figure 10:
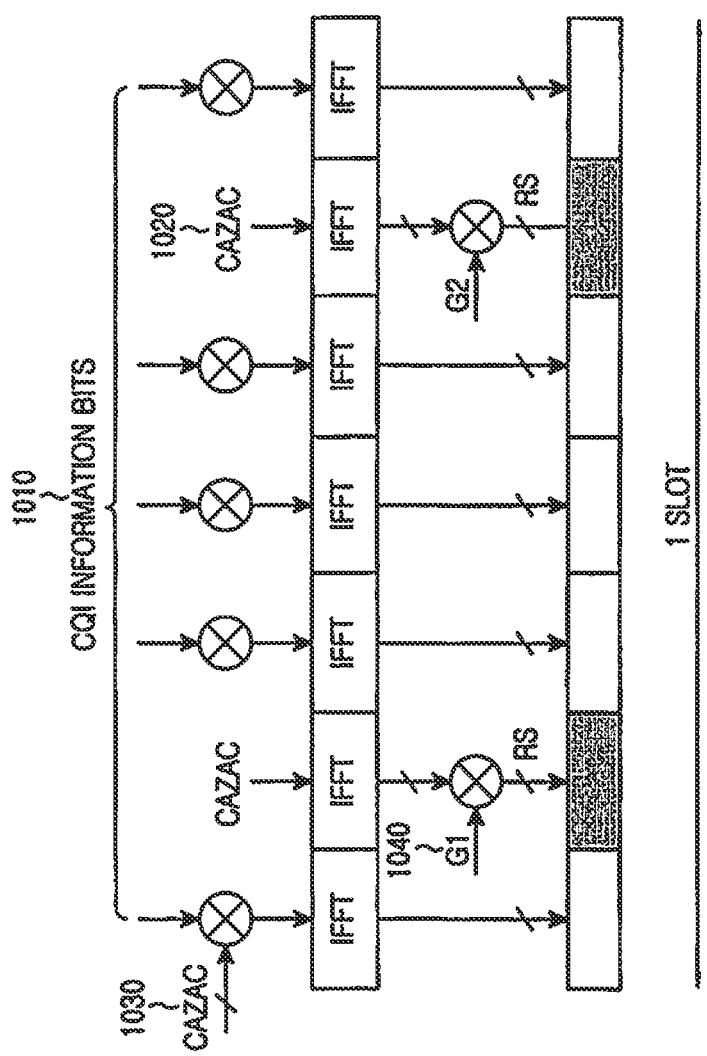
FIG. 10 is a diagram illustrating an exemplary PUCCH structure for transmitting CQI signals.

The same principle also applies if the RS multiplexing from a first UE is with the CQI transmission from another UE, which is also through the transmission of CAZAC-based sequences, as illustrated in FIG. 10. The multiplexing of RS from a first UE with the RS and CQI signals from another UE is again through different cyclic shifts of a CAZAC-based sequence.

If no cyclic shifts are available in the PUCCH (for example, in the ACK/NACK or CQI transmission), some RBs in some sub-frames may be reserved for RS transmission from a few UEs.

State transition information, such as a Release Request (RR) or a Service Request (SR), can also be sent using RS transmission with different cyclic shifts.

In a first embodiment, the present invention assumes that a UE is assigned at least two cyclic shift values. The first cyclic shift value can be used either for DM RS transmission in the PUSCH as illustrated in FIG. 1, or for PUCCH transmission as illustrated in FIG. 9 or FIG. 10. The second cyclic shift value is used for RS transmission without any other (non-RS) signal transmission in the respective TTI either during the DM RS symbols in the PUSCH or throughout the PUCCH. This RS serves either as an RR or as an SR and is multiplexed with the DM RS or the PUCCH transmission from another UE, which uses a third cyclic shift value which may be the same as the first cyclic shift value.

Figure 6:
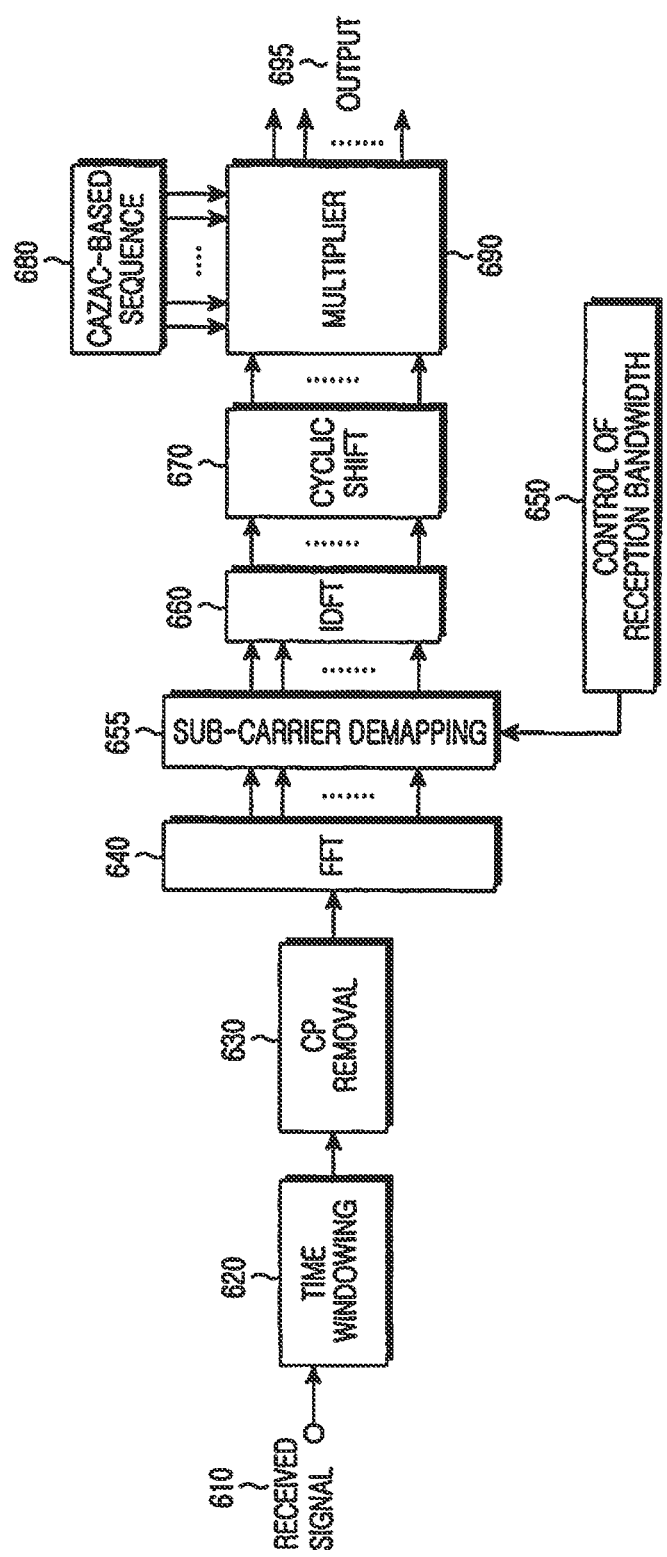
FIG. 6 is a block diagram illustrating a first exemplary SC-FDMA receiver for receiving a reference signal, an ACK/NACK signal, or a CQI signal, using a CAZAC-based sequence in the time domain.
Figure 7:
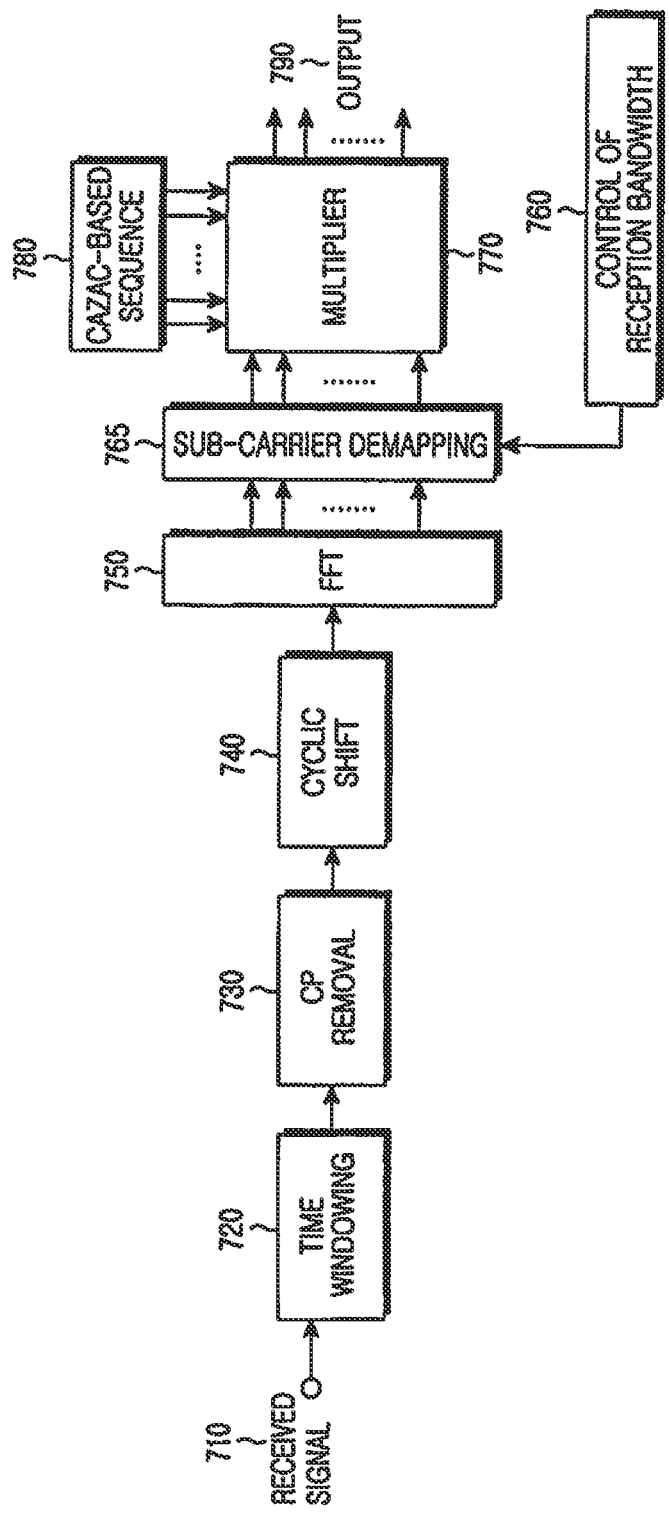
FIG. 7 is a block diagram illustrating a second exemplary SC-FDMA receiver for receiving a reference signal, an ACK/NACK signal, or a CQI signal, using a CAZAC-based sequence in the frequency domain.
Figure 8:
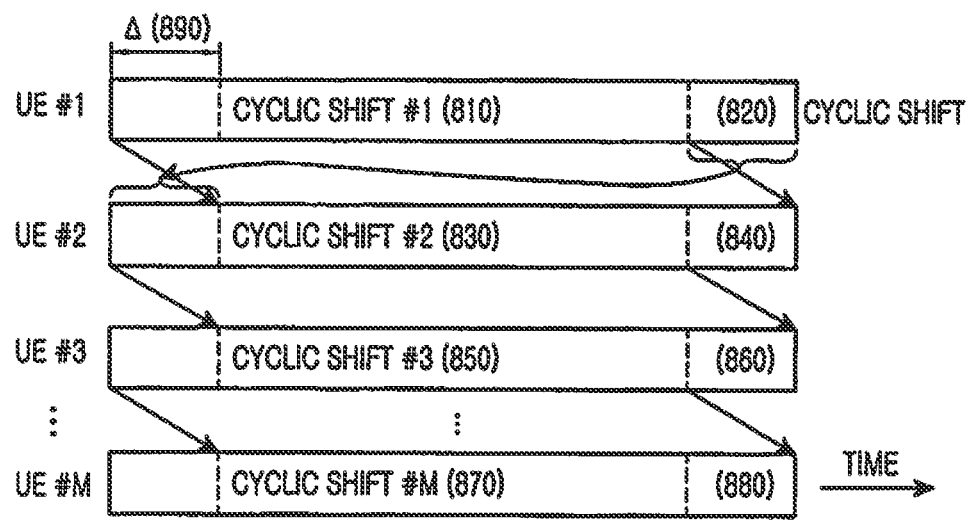
FIG. 8 is a block diagram illustrating an exemplary construction of orthogonal CAZAC-based sequences through the application of different cyclic shifts on a root CAZAC-based sequence.

A fourth cyclic shift value may be reserved to never be used, either for the DM RS in the PUSCH or for the PUCCH, so that the serving Node B can determine whether either a RR or a SR was transmitted. This can be achieved by comparing the output energy between the demodulation results using the second and fourth cyclic shift values. As the fourth cyclic shift value is not used for any transmission, the respective demodulation result will contain only noise. If the RS indicating an RR or an SR is transmitted using the second cyclic shift, the demodulation result will contain both the corresponding signal and noise. For the PUSCH, an exemplary demodulation process was described above in FIG. 6 or FIG. 7. Practically the same process also applies for the PUCCH.

In a second embodiment, the present invention assumes that a UE is assigned at least three cyclic shift values. The first cyclic shift value is used for the transmission of a DM RS in the PUSCH as illustrated in FIG. 1 or for PUCCH transmission as illustrated in FIG. 9 or FIG. 10. The second and third cyclic shift values are used for transmission of a RS without any other (non-RS) signal transmission in the corresponding TTI to indicate, respectively, an RR and the opposite of an RR (that is, that the UE still has data to transmit). The RS using the second or third cyclic shift value can be multiplexed with the DM RS of another UE having PUSCH transmission and using a fourth cyclic shift value, which may be the same as the first cyclic shift value, or with the PUCCH transmission of another UE using a fourth cyclic shift value. The Node B determines whether an RR or its opposite was sent by correlating the received signal during the RS symbols in the PUSCH or during the entire PUCCH with the second and third cyclic shift values and choosing the one providing the larger output energy. For the PUSCH, an exemplary demodulation process was described above relating to FIG. 6 or FIG. 7. The same process practically applies also for the PUCCH.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method for transmitting a reference signal (RS) by a user equipment (UE) in a wireless communication system, the method comprising:
   transmitting a demodulation reference signal (DM RS) and information data in a sub-frame; and
   transmitting a sounding reference signal (SRS) in a last symbol in a second slot from among two slots included in another sub-frame,
   wherein the DM RS is transmitted in only a middle symbol in each slot of the sub-frame, and
   wherein the information data is transmitted in other symbols in each slot of the sub-frame.

2. The method of claim 1, wherein a cyclic shift value used for transmitting the DM RS is different from a cyclic shift value used for transmitting the SRS.

3. The method of claim 1, wherein the DM RS and the information data are transmitted over a same bandwidth.

4. The method of claim 1, wherein a bandwidth used for transmitting the DM RS is different from a bandwidth used for transmitting the SRS.

5. A method for receiving a reference signal (RS) by a node B in a wireless communication system, the method comprising:
   receiving a demodulation reference signal (DM RS) and information data in a sub-frame; and
   receiving a sounding reference signal (SRS) in a last symbol in a second slot from among two slots included in another sub-frame,
   wherein the DM RS is received in only a middle symbol in each slot of the sub-frame, and
   wherein the information data is received in other symbols in each slot of the sub-frame.

6. The method of claim 5, wherein a cyclic shift value used for receiving the DM RS is different from a cyclic shift value used for receiving the SRS.

7. The method of claim 5, wherein the DM RS and the information data are received over a same bandwidth.

8. The method of claim 5, wherein a bandwidth used for receiving the DM RS is different from a bandwidth used for receiving the SRS.

9. A user equipment (UE) for transmitting a reference signal (RS) in a wireless communication system, the UE comprising:
   a controller; and
   a transmitter configured to transmit a demodulation reference signal (DM RS) and information data in a sub-frame, and to transmit a sounding reference signal (SRS) in a last symbol in a second slot from among two slots included in another sub-frame,
   wherein the DM RS is transmitted in only a middle symbol in each slot of the sub-frame, and
   wherein the information data is transmitted in other symbols in each slot of the sub-frame.

10. The UE of claim 9, wherein a cyclic shift value used for transmitting the DM RS is different from a cyclic shift value used for transmitting the SRS.

11. The UE of claim 9, wherein the DM RS and the information data are transmitted over a same bandwidth.

12. The UE of claim 9, wherein a bandwidth used for transmitting the DM RS is different from a bandwidth used for transmitting the SRS.

13. A node B for receiving a reference signal (RS) in a wireless communication system, the node B comprising:
   a controller; and
   a receiver configured to receive a demodulation reference signal (DM RS) and information data in a sub-frame, and to receive a sounding reference signal (SRS) in a last symbol in a second slot from among two slots included in another sub-frame,
   wherein the DM RS is received in only a middle symbol in each slot of the sub-frame, and
   wherein the information data is received in other symbols in each slot of the sub-frame.

14. The node B of claim 13, wherein a cyclic shift value used for receiving the DM RS is different from a cyclic shift value used for receiving the SRS.

15. The node B of claim 13, wherein the DM RS and the information data are received over a same bandwidth.

16. The node B of claim 13, wherein a bandwidth used for receiving the DM RS is different from a bandwidth used for receiving the SRS.

17. A method for transmitting a reference signal (RS) by a user equipment (UE) in a wireless communication system, the method comprising:
   transmitting a demodulation reference signal (DM RS), information data, and a sounding reference signal (SRS) in a sub-frame including two slots, each of the two slot including seven symbols,
   wherein the DM RS is transmitted in a middle symbol in each of the two slots,
   wherein the SRS is transmitted in a last symbol in a second slot from among the two slots, and
   wherein the information data is transmitted in first, second, third, fifth, sixth, and seventh symbols in a first slot from among the two slots, and in first, second, third, fifth, and sixth symbols in the second slot.

18. The method of claim 17, wherein a cyclic shift value used for transmitting the DM RS is different from a cyclic shift value used for transmitting the SRS.

19. The method of claim 17, wherein the DM RS and the information data are transmitted over a same bandwidth.

20. The method of claim 17, wherein a bandwidth used for transmitting the DM RS is different from a bandwidth used for transmitting the SRS.

21. A method for receiving a reference signal (RS) by a node B in a wireless communication system, the method comprising:
   receiving a demodulation reference signal (DM RS), information data, and a sounding reference signal (SRS) in a sub-frame including two slots, each of the two slots including seven symbols,
   wherein the DM RS is received in a middle symbol in each of the two slots,
   wherein the SRS is received in a last symbol in a second slot from among the two slots, and
   wherein the information data is received in first, second, third, fifth, sixth, and seventh symbols in a first slot from among the two slots, and in first, second, third, fifth, and sixth symbols in the second slot.

22. The method of claim 21, wherein a cyclic shift value used for receiving the DM RS is different from a cyclic shift values used for receiving the SRS.

23. The method of claim 21, wherein the DM RS and the information data are received over a same bandwidth.

24. The method of claim 21, wherein a bandwidth used for receiving the DM RS is different from a bandwidth used for receiving the SRS.

25. A user equipment (UE) for transmitting a reference signal (RS) in a wireless communication system, the UE comprising:
   a controller; and
   a transmitter configured to transmit a demodulation reference signal (DM RS), an information data, and a sounding reference signal (SRS) in a sub-frame including two slots, each of the two slots including seven symbols,
   wherein the DM RS is transmitted in a middle symbol in each of the two slots,
   wherein the SRS is transmitted in a last symbol in a second slot from among the two slots, and
   wherein the information data is transmitted in first, second, third, fifth, sixth, and seventh symbols in a first slot from among the two slots, and in first, second, third, fifth, and sixth symbols in the second slot.

26. The UE of claim 25, wherein a cyclic shift value used for transmitting the DM RS is different from a cyclic shift value used for transmitting the SRS.

27. The UE of claim 25, wherein the DM RS and the information data are transmitted over a same bandwidth.

28. The UE of claim 25, wherein a bandwidth used for transmitting DM RS is different from a bandwidth used for transmitting the SRS.

29. A node B for receiving a reference signal (RS) in a wireless communication system, the node B comprising:
   a controller; and
   a receiver configured to receive a demodulation reference signal (DM RS), information data, and a sounding reference signal (SRS) in a sub-frame including two slots, each of the two slots including seven symbols,
   wherein the DM RS is received in a middle symbol in each slot of the two slots,
   wherein the SRS is received in a last symbol in a second slot from among the two slots, and
   wherein the information data is received in first, second, third, fifth, sixth, and seventh symbols in a first slot from among the two slots, and in first, second, third, fifth, and sixth symbols in the second slot.

30. The node B of claim 29, wherein a cyclic shift value used for receiving the DM RS is different from a cyclic shift values used for receiving the SRS.

31. The node B of claim 29, wherein the DM RS and the information data are received over a same bandwidth.

32. The node B of claim 29, wherein a bandwidth used for receiving DM RS is different from a bandwidth used for receiving the SRS.

* * * * *